(12) United States Patent
Monro

(10) Patent No.: US 7,809,747 B2
(45) Date of Patent: Oct. 5, 2010

(54) FUZZY DATABASE MATCHING

(76) Inventor: Donald Martin Monro, 6 The Lays, Goose Street, Beckington, Somerset (GB) BA11 6RS ( * ) Notice: Subject to any disclaimer, the term of this patent is extended or adjusted under 35 U.S.C. 154(b) by 0 days.

(21) Appl. No.: 11/585,358

(22) Filed: Oct. 23, 2006

(65) Prior Publication Data

US 2008/0097983 A1   Apr. 24, 2008

(51) Int. Cl.
*G06F 7/00* (2006.01)
*F06F 17/00* (2006.01)
(52) U.S. Cl. .................. 707/780; 707/696; 382/116; 382/117
(58) Field of Classification Search .................. None
See application file for complete search history.

(56) References Cited

U.S. PATENT DOCUMENTS

| | | | |
|---|---|---|---|
| 4,896,363 A * | 1/1990 | Taylor et al. ............... | 382/125 |
| 5,291,560 A * | 3/1994 | Daugman ................... | 382/117 |
| 5,841,888 A * | 11/1998 | Setlak et al. ............... | 382/124 |
| 5,924,094 A | 7/1999 | Sutter | |
| 5,978,793 A | 11/1999 | Kashyap et al. | |
| 6,018,739 A | 1/2000 | McCoy et al. | |
| 6,067,369 A * | 5/2000 | Kamei ..................... | 382/125 |
| 6,081,620 A * | 6/2000 | Anderholm ................ | 382/194 |
| 6,243,492 B1 * | 6/2001 | Kamei ..................... | 382/181 |
| 6,505,193 B1 | 1/2003 | Musgrave et al. | |
| 6,701,313 B1 | 3/2004 | Smith | |
| 6,879,718 B2 | 4/2005 | Hullender | |
| 2001/0056485 A1 | 12/2001 | Barrett et al. | |
| 2002/0129012 A1 * | 9/2002 | Green ....................... | 707/3 |
| 2002/0163506 A1 * | 11/2002 | Matusis .................... | 345/173 |
| 2003/0061233 A1 | 3/2003 | Manasse et al. | |
| 2003/0086617 A1 * | 5/2003 | Huang ..................... | 382/218 |
| 2004/0165755 A1 * | 8/2004 | Hillhouse .................. | 382/124 |
| 2004/0202355 A1 * | 10/2004 | Hillhouse .................. | 382/124 |
| 2005/0097131 A1 * | 5/2005 | Benco et al. .............. | 707/104.1 |
| 2005/0102325 A1 | 5/2005 | Gould et al. | |
| 2005/0193016 A1 | 9/2005 | Seet et al. | |
| 2005/0234901 A1 | 10/2005 | Caruso | |
| 2006/0026128 A1 | 2/2006 | Bier | |
| 2006/0104493 A1 * | 5/2006 | Hsieh et al. ............... | 382/125 |

OTHER PUBLICATIONS

Image Based fingerprint verification, Seow et al (2002 Student conference on research and development proceedings, Shah alam, Malaysia).*

(Continued)

*Primary Examiner*—Pierre M Vital
*Assistant Examiner*—Augustine Obisesan
(74) *Attorney, Agent, or Firm*—Ungaretti & Harris LLP

(57) ABSTRACT

A method of improving the speed with which a sample such as a biometric sample can be fuzzily matched against records in a database, comprises extracting characteristics from the sample, and using those extracted characteristics as indexes (70) to address a lookup table (25). Each row within the lookup table points to an individual record occurrence list (28, 30, 32) which contain details of not only the stored records from which the given characteristic can be extracted, but also those records having an extracted characteristic which are within a defined proximity to the said characteristic. Characteristics are extracted from the sample record, and a given stored record is identified as being a possible match with the sample if it appears in a required number of record occurrence lists.

16 Claims, 2 Drawing Sheets

OTHER PUBLICATIONS

International Search Report and Written Opinion in PCT/GB2007/004035 mailed May 7, 2009.

International Search Report in PCT/GB2007/004037 mailed Mar. 7, 2008.

Dodis, Yevgeniy et al., "Fuzzy Extractors: How to Generate Strong Keys from Biometrics and Other Noisy Data", *Advances in Cryptology: Eurocrypt 2004 Lecture Notes in Computer Science; LNCS, Springer-Verlag*, BE, vol. 3027, 2004, pp. 523-540.

Hull, Jonathan J., "Document Image Matching and Retrieval With Multiple Distortion-Invariant Descriptors", *International Association for Pattern Recognition Workshop on Document Analysis Systems*, XX, XX, 1995, pp. 379-396.

Hull, Jonathan J. et al., "Document Image Matching Techniques", *Symposium on Document Image Understanding Technology*, Annapolis, MD, Apr. 30-May 2, 1997, pp. 31-35.

Smeaton, A.F. et al., "The Nearest Neighbour Problem in Information Retrieval: An algorithm using upper bounds", *Sigir Forum, ACM*, New York, NY, US, vol. 16, No. 1, 1981, pp. 83-87.

Wong, W.Y.P. et al., "Implementations of Partial Document Ranking Using Inverted Files", *Information Processing & Management, Elsevier*, Barking, GB, vol. 29, No. 5, Oct. 1993, pp. 647-669.

\* cited by examiner

FUZZY DATABASE MATCHING

CROSS REFERENCE TO RELATED APPLICATIONS:

This application is being filed concurrently with U.S. application Ser. No. 11/585,365 entitled "Fuzzy Database Matching", the contents of which are hereby incorporated by reference.

FEDERALLY SPONSORED RESEARCH OR DEVELOPMENT

None.

TECHNICAL FIELD

The invention relates to the field of database systems. In particular, it relates to a method and system for improving the speed with which a candidate record may reliably be fuzzily matched against a record within the database.

BACKGROUND OF THE INVENTION

There is increasing need within a variety of fields to be able to determine very rapidly whether or not a particular sample record already exists within a large database, and if so to identify one or more matches. One particular field is biometrics, in which the requirement is to determine whether or not the individual who has provided a particular biometric sample is already in the database.

Databases of the type described can be extremely large, and it may be impractical to attempt a full match analysis between the sample record and every one of the records within the database. In order to reduce the computational workload, a variety of pre-screening processes are in use, but many of these have very restricted fields of application since they often rely upon specific peculiarities of the matching algorithm or of the data that are to be matched.

An issue that arises particularly with the matching of biometric data, although it occurs in other applications as well, is that by their nature biometric measurements are often not precisely reproducible. For example, repeated biometric measurements derived from the iris of a particular individual are likely to vary somewhat, not least because the extent of iris occlusion by the eyelid and eyelashes will vary between images. As a result, biometric matching normally relies upon the concept of an approximate or "fuzzy" match, rather than on an exact match.

A typical scenario is the need to determine whether a particular individual exists within a large database of individuals. For example, we may have an iris scan of an individual and want to know whether a national security database already contains one or more iris scans of the same individual. Because the sample iris scan and the stored iris scans are unlikely to be identical in all respects, one way of achieving the necessary "fuzzy" match is to search over a region. Having converted both the sample and the stored records into codes, according to some predefined protocol, we can attempt to find a match between a stored record and any code within a region which we consider to be sufficiently close to the sample code. Alternatively, we may attempt a match between the sample code and any code within a search region which is sufficiently close to one of the stored codes. In either case, the need to search over a region of codes when doing the fuzzy match may significantly slow down the matching process.

The present invention is provided to solve the problems discussed above and other problems, and to provide advantages and aspects not provided by prior database systems of this type. A full discussion of the features and advantages of the present invention is deferred to the following detailed description, which proceeds with reference to the accompanying drawings.

SUMMARY OF THE INVENTION

According to a first aspect of the present invention there is provided a method of identifying possible matches between a sample record and a plurality of stored records, the method comprising:

(a) Extracting from the stored records a plurality of characteristics, said characteristics falling within a characteristic space;

(b) For each said characteristic, maintaining a record occurrence list of stored records from which said characteristic and characteristics within a defined proximity to said characteristic within said characteristic space have been extracted;

(c) Extracting characteristics from a sample record; and (d) Identifying a given stored record as being a possible match with the sample if it appears in a required number of record occurrence lists.

According to a further aspect of the invention there is provided a system for identifying possible matches between a sample record and a plurality of stored records using a plurality of characteristics within a characteristic space, the system comprising:

(a) For each characteristic, a record occurrence list of stored records from which said characteristic and characteristics within a defined proximity to said characteristic within said characteristic space have been extracted;

(b) A processor for extracting characteristics from the sample record; and (c) A processor for identifying a given stored record as being a possible match with the sample if it appears in a required number of record occurrence lists.

Such a method provides very fast candidate-matching at the expense of some additional effort when registering a new record within the database. The trade-off is well worth while when matching is done frequently in comparison with the frequency of registration of new records.

In some embodiments, separate processors may be used for matching characteristics against sample records, and for identifying stored records as possible matches. These processors may be on separate computers, and may be remote from each other.

In one particular embodiment, the main data list including the full collection of stored records may be held separately from the characteristic list. That allows a local processor, to carry out the initial analysis on a sample record such as a locally—obtained iris scan. Once a list of possible matches has been identified, that list can then be passed to a remote server, where a more detailed analysis can be carried out by comparing the sample with the full encoded iris scans of each of the possible matches.

This approach has the further advantage that the designer of the system does not need to distribute to a large number of users full copies of the entire database of encoded iris scans. Instead, each user simply receives a list of characteristics, which is enough for the initial analysis to be carried locally. Where one or more possible matches are found, the system may then be automatically report to a central location where further analysis can be carried out against the full records.

Other features and advantages of the invention will be apparent from the following specification taken in conjunction with the following drawings.

BRIEF DESCRIPTION OF THE DRAWINGS

The invention may be carried in practice in a number of ways and some specific embodiments will now be described, by way of example, with reference to the accompanying drawings, in which.

Figure 1:
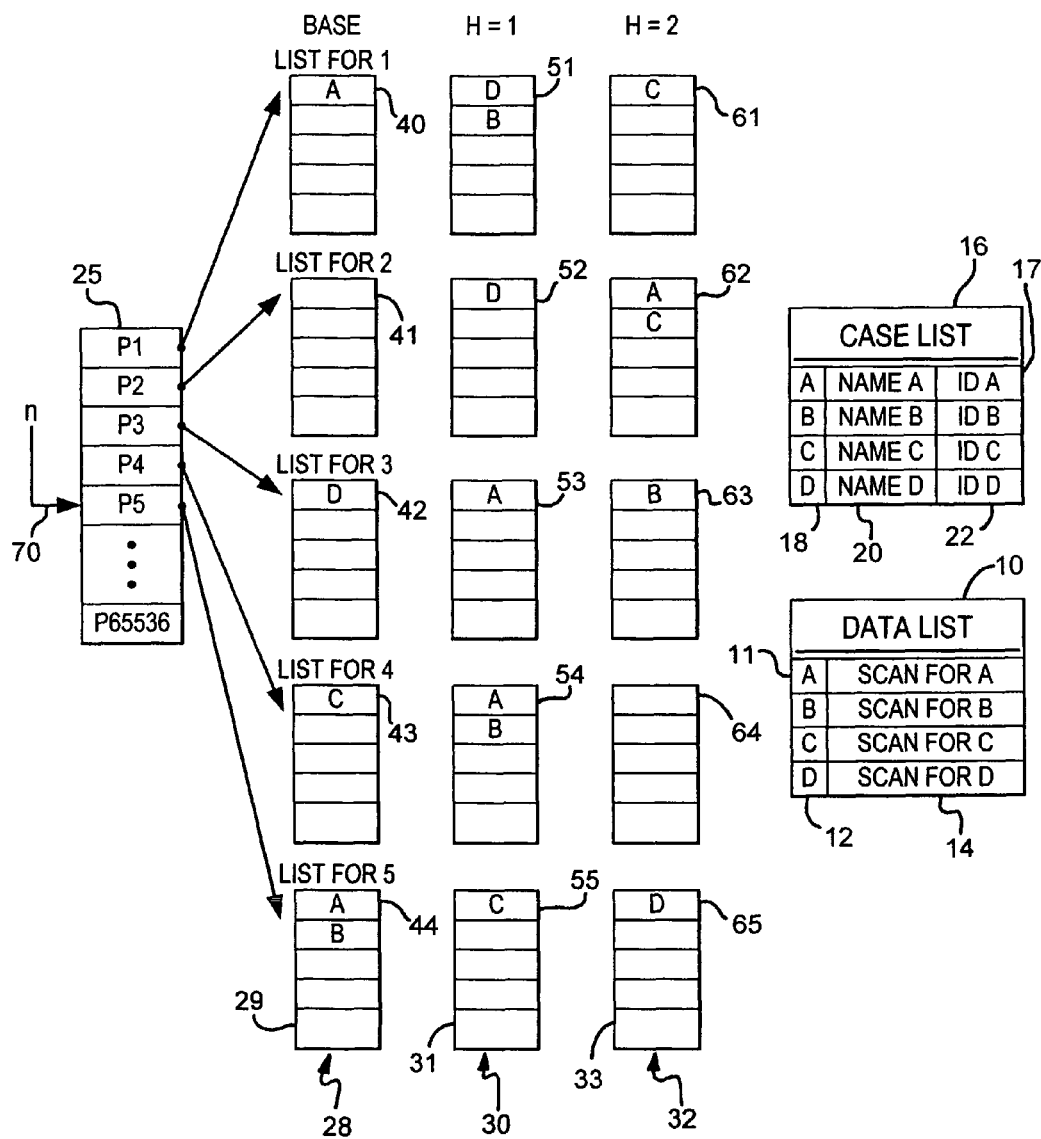
FIG. 1 shows the database structure according to an embodiment of the invention.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

For the sake of clarity the description below will be directed toward an exemplary embodiment in the biometric field. In the embodiment to be described, an iris scan has been taken of a particular individual, and the need is to determine whether another iris scan of the same individual already exists within a large database such as a national security database.

It will of course be understood that this particular example is simply used to illustrate the general principles behind the invention, and that the same techniques will be equally applicable in other fields. The invention in its broadest form is not restricted to any particular class or type of data held within the database, nor to the details of the matching algorithms that are used.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The database structure of the exemplary embodiment is shown schematically in FIG. 1. Details of particular individuals are held within a case list or table 16, each row 17 of which represents a specific iris scan of a specific individual. Ideally, each individual will be represented by a single iris scan, but of course in a typical national security database, there will in practice be multiple scans of at least some individuals. Each row or iris scan record include columns 18, 20, 22, which respectively hold a unique iris scan reference number for use within the system, the name of the individual, where known, and an external identifier such as a national security or social security code.

The full iris scan for each record is held within a separate data list or table 10, each row 11 of which represents an individual scan. This table consists of two columns, the first 12 being the unique reference number, mentioned above, and the second 14 holding the complete scan in some suitable encoded form. Where necessary, the original raw scan, as imaged, may also be stored as well. More generally, the column 14 may be considered to hold some encoded representation which uniquely identifies a specific scan or other biometric record of a particular individual.

Each registered case (iris scan) is classified according to a plurality of attributes, characteristics or codes, these being extracted or derived either from the raw iris scans or more typically from the encoded scan data 14.

The codes may, but need not, be representative of human-identifiable characteristics of the scan. For example, some of the codes could be representative of eye color, with others being representative of such characteristics as the amount of color and intensity variation within the iris. Alternatively, the encoded scans 14 may be treated as a pure data stream, with the codes simply resulting from some function or functions applied to the data stream. Apart from the hash function already mentioned, a further possibility would be to search for the presence or absence of specific groups of bits within the data stream. In any event, it will be understood that multiple codes will typically be extracted from each individual record 11.

To facilitate the use of these codes as indexes (as will be described in more detail below) the codes are typically constrained to be numeric, and to lie within a particular predefined range. In a biometric application, for example, the codes might for example be defined by 16 binary bits, allowing 65536 possible codes to occur. Preferably, the functions or operations which generate these codes from the raw or encoded data are limited in their possible range of outputs so that only the desired codes are possible. Alternatively, the actual range of outputs is remapped to a list of numeric codes within the desired range. A mapping table (not shown) may be used if required. In the example being described, it will be assumed that the available codes $P_n$ are integers, in the range 0 to 65535, with each being stored as a 16-bit code. Thus, P1=001, P2=010, P3=011, P4=100, P5=101 and so on, up to the full 16 bits.

To categorize the codes according to the cases (iris scans) in which they appear, a plurality of lists or tables 28 is maintained, one for each of the possible 65536 codes. For simplicity, only five of these lists are shown in FIG. 1. As may be seen, the list 40 for the code value 1 contains just a single row, indicating that only name A generates this code. The list 41, representing code value 2, contains no data since in the present example none of the registered iris scans generates that code. The lists 42, 43, representing respectively code values 3 and 4, each relate just to a single scan. The table 44 indicates that iris scans for names A and B each generate code value 5.

Although not essential, it is generally preferred that each of the tables or lists 28 contains in each row 29 simply the unique reference 18 to a single record which corresponds to the relevant code.

In addition to the lists 28, a second series of lists 30 is maintained, each of these lists relating not simply to an individual code but rather to those codes which are a given distance from the corresponding base code, according to some desired metric such as the Hamming distance.

For reference in the example given by FIG. 1, the Hamming distances between the codes 1 to 5 are given in Table 1. The Hamming distance is the number of bits that are different between two codes. For example the Hamming distance between codes 1 and 2 is 2, because 2 bits are changed between the code for 1 (001) and the code for 2 (010).

TABLE 1

Hamming Distances between the binary codes for numbers 1 to 5.

| | Codes | | | | |
|---|---|---|---|---|---|
| | 1 (001) | 2 (010) | 3 (011) | 4 (100) | 5 (101) |
| 1 | 0 | 2 | 1 | 2 | 1 |
| 2 | 2 | 0 | 1 | 2 | 3 |
| 3 | 1 | 1 | 0 | 3 | 2 |
| 4 | 2 | 2 | 3 | 0 | 1 |
| 5 | 1 | 3 | 2 | 1 | 0 |

In the example shown, the tables 30 contain data relating to those cases which resolve to a code having a Hamming distance of exactly 1 from the corresponding base code of the tables 28. Thus, for example, the table 51 includes data for all of those codes which are exactly H=1 distant from P1 (0001). If, however codes at H=1 already occur in table 40 they may be omitted from table 51 for efficiency. In the example of FIG. 1, code 1 is H=1 distant from codes 3 and 5. The name D from the base list for 3 qualifies, and the names A and B from the base list for 5 qualify. However, name A has already occurred in the base list for code 1, so only names D and B are included in table 51. Likewise, the table 52 includes data for all of those codes which are exactly H=1 distant from P2 (0010), and so on. However, if codes at H=1 already occur in table 41, they may be omitted from table 52 for efficiency. In the example, code 3 is H=1 distant from code 2, so that name D is added to table 52 from the base list for 3. Because table 41 is empty, there are no codes at H=1 from code 2 to omit from table 52.

A third series of table 32 contain details of cases which resolve to codes which are H=2 distant from the corresponding bases codes. Further series of tables (not shown) for H=3, H=4 and so on may also be provided, if required.

It will be appreciated that the Hamming distance has been used to illustrate the embodiment and that any other convenient metric may be used. The required metric (eg Hamming distance) may be chosen according to the particular application in hand, and may either be fixed or may be user selectable. In more sophisticated embodiments (not shown) the codes may be multidimensional, with the required metric being measured within a corresponding multidimensional space.

Whenever a new iris scan is to be registered within the database, its details are added to the case and data lists 16, 10 and the corresponding codes for the new scan are calculated and/or determined. The scan's unique reference number 18 is then added, as appropriate, to one or more of the individual lists 28, 30, 32. If desired, one or more new codes may be added to the code list 24, in which case the individual tables 28 are automatically created, and each iris scan within the database is checked to determine whether its reference number needs to be added to one or more of the newly created tables.

We now turn to the task of matching, or in other words determining whether an unknown iris scan matches one of the scans 14 within the database. Rather than matching the scan against the encoded data, which would be computationally lengthy, instead the sample is processed to extract from it one or more code values. By applying the same function or functions that were originally applied to the registered scans, one or more sample codes are generated (those codes of course in the present example all being integral and lying within the range 0 to 65535).

To find which scans correspond with each sample code, each code n is used as an index 70 to a look-up table 25, this table containing pointers P1, P2, P3 . . . which point to the respective areas in memory which hold the code value 1, 2 and 3 lists. If each of the lists centered on a particular nominal code value follow one another in memory, only a single pointer (plus an offset) will be required. Alternatively, separate pointers could be provided for the respective lists within the series 28, the series 30 and the series 32. Another possibility would be for each of the lists 28 to have a pointer which looks to the corresponding list in 30, and so on.

Figure 2:
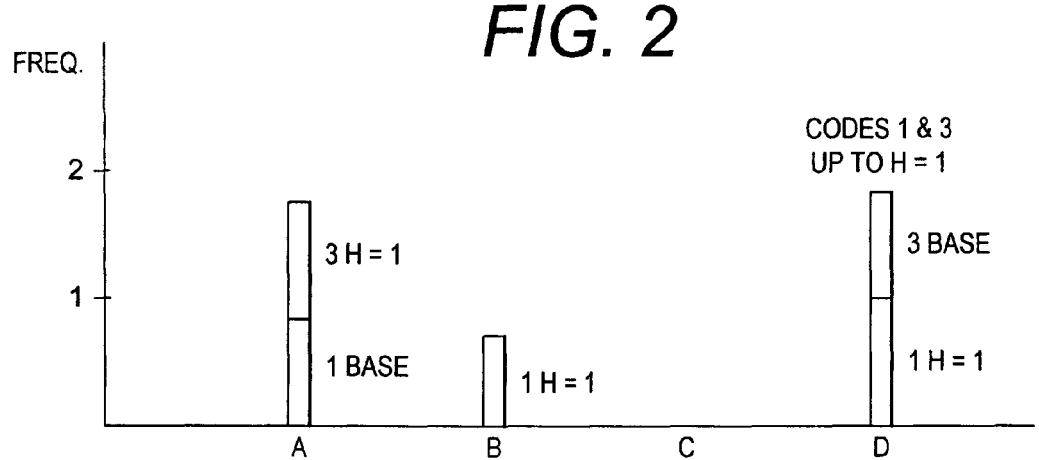
FIG. 2 is a histogram exemplifying the matching process.

Once the appropriate tables have been identified, the system then proceeds to identify candidate matches by building up a histogram of the number of occurrences of each case across all of the tables of a particular Hamming distance. FIG. 2 illustrates an example in which a sample scan has generated code values 1 and 3, and in which candidate matches are to be identified using a Hamming distance of up to 1. This is achieved by looking at the records in the base tables 40, 42 for the codes 1 and 3, along with the related H=1 tables 51, 53. The base code tables generate two hits, namely A and D while the H=1 tables generate three additional hits A, B and D.

A threshold is applied to the count, and any record which scores at least the threshold value is considered to be a candidate match. Here, if the threshold is taken as 1, the candidate matches are scans A, B and D. At a threshold of 2, the candidates are A and D.

Figure 3:
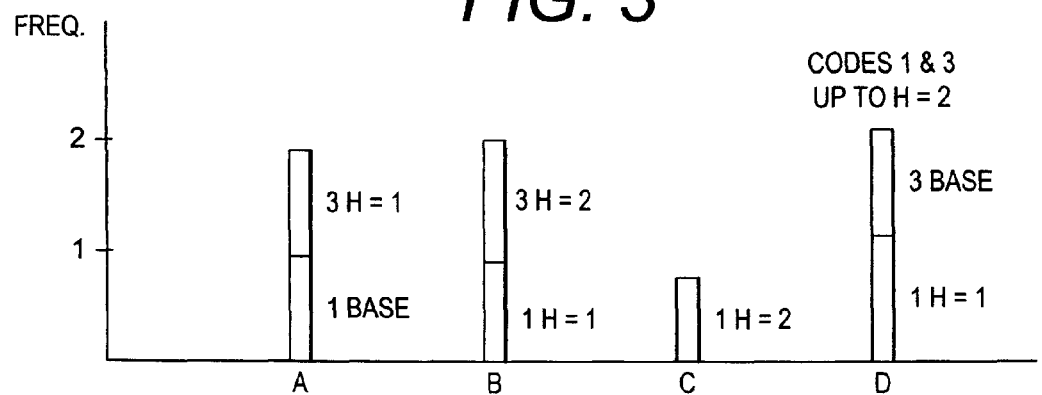
FIG. 3 is another exemplary histogram.

FIG. 3 shows the histogram for the same sample, generating codes 1 and 3, but this time tested against a Hamming distance of up to 2 Here, the hits from the base tables 40, 42 are A and D, the additional hits from the H=1 tables 51, 53 are A, B, and D, and the additional hits from the H=2 tables 61, 63 are B and C. Applying a threshold of 1 gives us A, B, C and D as candidate matches, whereas applying a higher threshold of 2 returns A, B, and D as candidates.

Although the counts are shown in FIGS. 2 and 3 as histograms, it will be understood that other counting methods could equally well be used, and that in any event the actual histograms would typically not be plotted.

In alternative embodiments (not shown) the second series of tables 30 could include data not only from codes which are exactly H=1 distant from the corresponding base code, but instead all codes which are up to that distance. In such an arrangement, each H=1 table would include all the data of the corresponding base table, each H=2 table would include all the data of the corresponding H=1 table, and so on.

The output response of the system may be tuned, according to the application, by selecting suitable values for the threshold and/or Hamming distance. Either or both of these values could be fixed, programmatically varied, or user varied. In some applications it may be convenient for the user to be able to select appropriate values of either or both of these parameters at run time.

In some applications, more complex matching algorithms may be envisaged. For example, different threshold values may be used for different Hamming distances. The system could also automatically select candidates at a variety of Hamming distances, and compare or combine the respective selections at different distances to generate an improved composite list of candidate matches.

The threshold and/or Hamming distance selections may be determined, where necessary according to the extent to which the pre-selection process needs to remove a large number of cases from consideration in order to speed up the overall matching process. Although the use of a simple count and a fixed threshold is a convenient way of dividing possible matches from non-matches, other algorithms could equally well be used. One possible approach, for example, would be to select as a possible match all of those cases having a characteristic count which is more than a fixed percentage higher than the average characteristic count taken across all cases.

Depending upon the size of the sample to be evaluated, it may not be necessary to use the sample in its entirety: a sub-section of the data be all that is necessary.

The selection of codes, the matching criteria and the size of sample to be analyzed will in most applications be chosen so that there is an acceptably low risk of a false rejection.

Once a list of candidate matches has been selected, using one of the procedures described above, a more detailed match may then be carried out against each of the possibilities, using any convenient matching algorithm. In the example described, the sample scan may be compared against the candidates within the database using some more sophisticated but slower algorithm.

In one embodiment, the database itself may be held on the same computer or at the same location where the preliminary and/or the final matching takes place. Alternatively, the process may be distributed, with the preliminary matching being carried out according to a code list held at a local computer, and the preliminary matches being passed on to a remote computer for the detailed matching to take place. Such an arrangement allows the primary data list 10 (which includes the full data representing all the stored scans) to be held at a central location, with a local machine needing to hold just the individual case occurrence lists 28, 30, 32.

Figure 4:
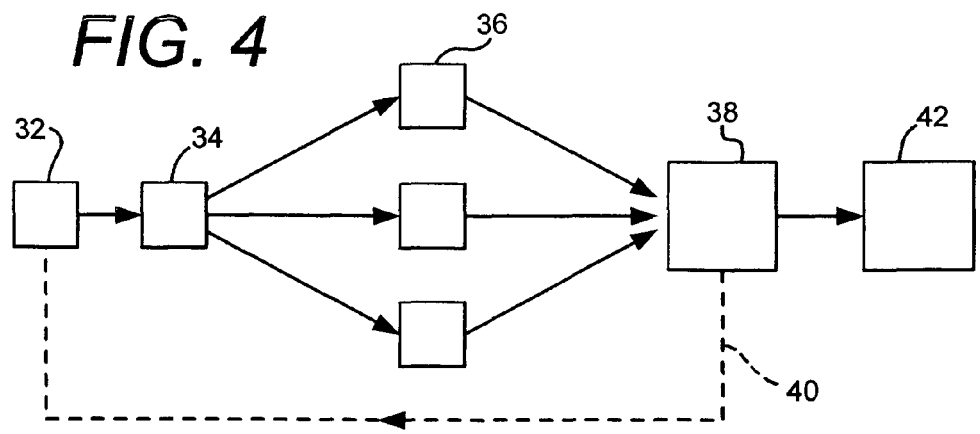
FIG. 4 shows some exemplary hardware.

In another embodiment, shown in FIG. 4, the process of the present invention may further be speeded up by using multiple computers or processors operating in parallel. A user computer 32 forwards a matching task to a controller 34 which splits it up and distributes it between a plurality of computers or processors 36. Each processor 36 may be instructed to handle a particular code or group of codes; alternatively, the controller 34 may split up the work in some other way. The processors 36 pass their results onto a consolidator 38, which finalizes the selection of possible matches (for example using the procedure illustrated in FIGS. 2 and 3). The list of possibilities is then forwarded as required, either to a computer or processor 42 which carries out the detailed matching or as shown by reference numeral 40 back to the user 32 for further analysis.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method of identifying possible matches between a sample record and a plurality of stored records, the method comprising:

extracting from each of the stored records a plurality of index characteristics, said index characteristics falling within an index characteristic space;

maintaining a look-up table defining said index characteristic space, said look-up table having a plurality of rows, each row corresponding to a unique index characteristic within said index characteristic space;

maintaining a plurality of record occurrence lists, each said list being linked from a specific row in said look-up table corresponding to a specific index characteristic, and each said list identifying those stored records from which said specific index characteristic and index characteristics within a defined proximity to said specific index characteristics within said index characteristic space have been extracted;

extracting sample index characteristics from a sample record;

using said sample index characteristics as indexes to address said look-up table to look up a corresponding plurality of record occurrence lists which are associated with said sample index characteristics;

building a histogram as index characteristics are extracted recording matches by stored record;

counting the number of occurrences of respective stored records identified within said record occurrence lists from the histogram; and identifying a given stored record as being a possible match with the sample if said count from the histogram for said given stored record exceeds a required threshold.

2. A method as claimed in claim 1 in which the defined proximity is a defined Hamming distance.

3. A method as claimed in claim 2 in which the defined Hamming distance is user-selectable.

4. A method as claimed in claim 1 in which the required number is a numerical threshold.

5. A method as claimed in claim 1 in which the required number is a function of the average number of record occurrence lists per stored record.

6. A method as claimed in claim 1 in which said plurality of index characteristics defines all index characteristics within the index characteristic space that are extracted from said plurality of stored records.

7. A method as claimed in claim 1 in which said plurality of index characteristics defines all possible index characteristics within the index characteristic space that could be displayed by a sample record.

8. A method as claimed in claim 1 in which the said plurality of index characteristics is generated by applying an operation, such as a hash, to the stored records.

9. A method as claimed in claim 1 including establishing a plurality of defined proximities, and maintaining a separate record occurrence list for each index characteristic and proximity combination.

10. A method as claimed in claim 9 in which the identifying step uses those lists which relate to a user-selected defined proximity.

11. A method as claimed in claim 1 including the additional step of further analyzing the relationship between the sample record and each of the said possible matches.

12. A method as claimed in claim 1 in which the said identifying step is divided between a plurality of parallel processors, each forwarding an association result to a consolidator, said consolidator identifying stored records as possible matches in dependence upon said association results.

13. A system for identifying possible matches between a sample record and a plurality of stored records, the system comprising:

a computer processor coupled to a database containing a plurality of index characteristics extracted from said stored records, said index characteristics falling within an index characteristic space;

a look-up table defining said characteristic space, said look-up table having a plurality of rows, each row corresponding to a unique index characteristic within said index characteristic space;

a plurality of record occurrence lists, each said list being linked from a specific row in said look-up table corresponding to a specific index characteristic, and each said list identifying those stored records from which said specific index characteristic and index characteristics within a defined proximity to said specific index characteristics within said index characteristic space have been extracted;

and whereby the system is configured to:

extract sample index characteristics from a sample record, and use said sample index characteristics as indexes to address said look-up table to look up a corresponding plurality of record occurrence lists which are associated with said sample index characteristics;

build a histogram as index characteristics are extracted recording matches by stored record;

count the number of occurrences of respective stored records identified by said record occurrence lists from the histogram; and identify a given stored record as being a possible match with the sample record if said count from the histogram for said given stored record exceeds a required threshold.

14. A system as claimed in claim 13 in which the computer processor includes a first processor for extracting sample index characteristics from a sample record and a second processor for identifying a given stored record as being a possible match with the sample record.

15. A system as claimed in claim 14 in which the first processor is remote from the second processor.

16. A system as claimed in claim 13 in which the first processor comprises a plurality of parallel processors, each forwarding an association result to a consolidator, said consolidator identifying stored records as possible matches in dependence upon said associated results.

* * * * *